3 Sheets—Sheet 2.

J. KIEFFER.
Machinery for Molding Counters or Stiffeners for Boots and Shoes.

No. 205,191. Patented June 25, 1878.

Witnesses
S. N. Piper
[signature]

Inventor
Joseph Kieffer
by his attorney
R. H. Eddy

3 Sheets—Sheet 3.
J. KIEFFER.
Machinery for Molding Counters or Stiffeners for Boots and Shoes.
No. 205,191. Patented June 25, 1878.
FIG. 3
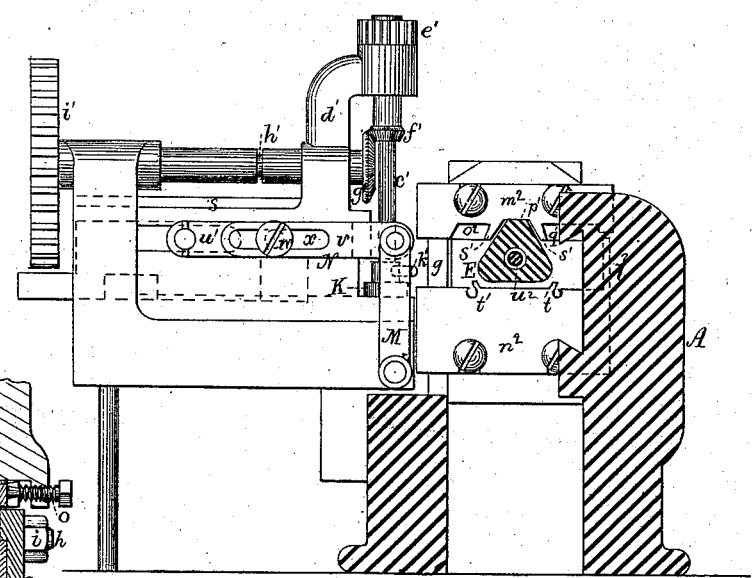
FIG. 6.
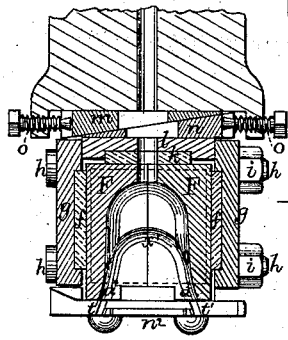
FIG. 10. FIG. 11.
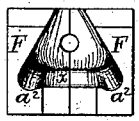 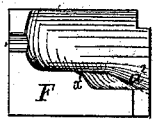
FIG. 4
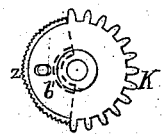
FIG. 5
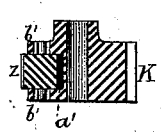
FIG. 7.
FIG. 8.
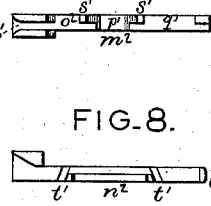
FIG. 9.
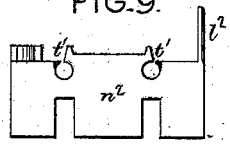
Witnesses
S. N. Piper
L. W. Müller
Inventor
Joseph Kieffer.
by his attorney.
R. H. Eddy

UNITED STATES PATENT OFFICE.

JOSEPH KIEFFER, OF MONTREAL, QUEBEC, CANADA.

IMPROVEMENT IN MACHINERY FOR MOLDING COUNTERS OR STIFFENERS FOR BOOTS AND SHOES.

Specification forming part of Letters Patent No. 205,191, dated June 25, 1878; application filed February 15, 1878.

*To all whom it may concern:*

Be it known that I, JOSEPH KIEFFER, of the city of Montreal, of the Province of Quebec, of the Dominion of Canada, have invented new and useful Improvements in Machinery for Molding Heel Counters or Stiffeners for Boots or Shoes; and do hereby declare the same to be described in the following specification and represented in the accompanying drawings, of which—

Figure 1:
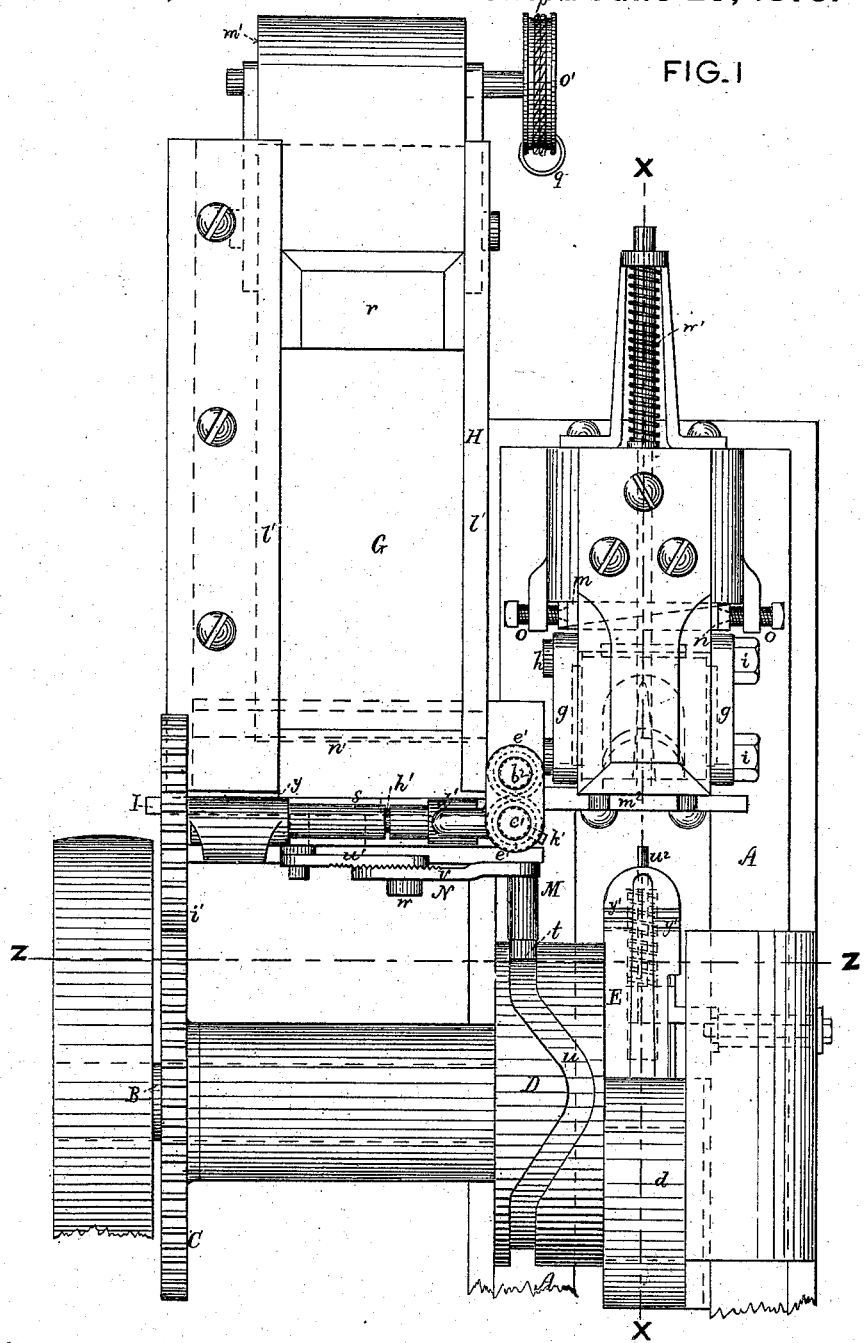
Figure 2:
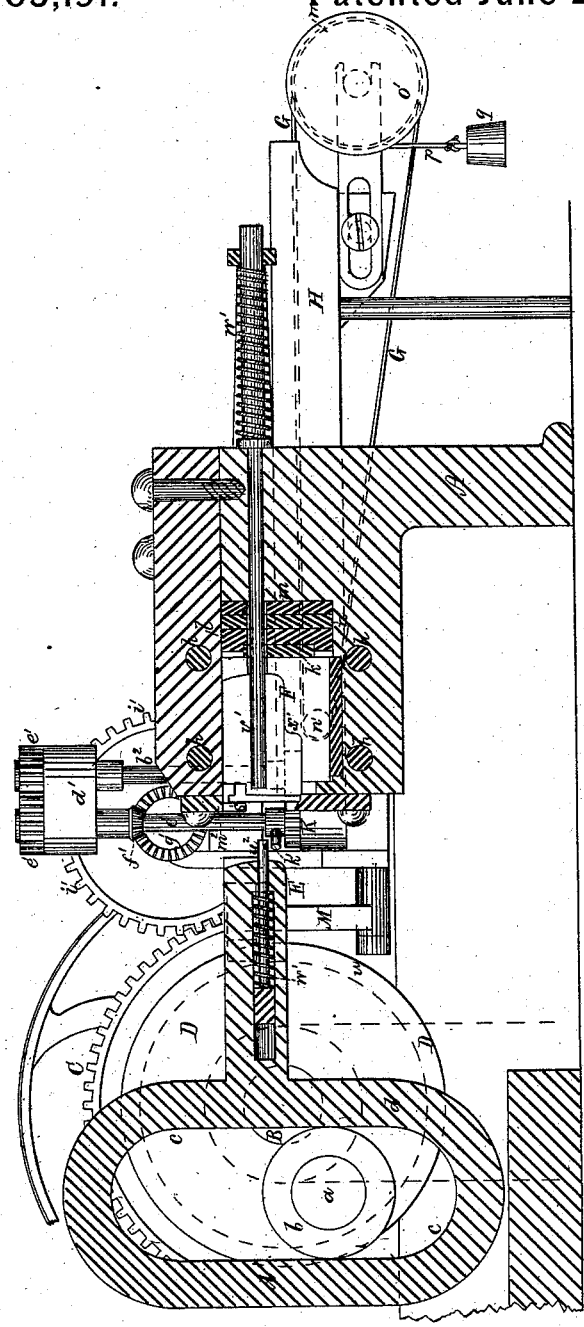

Figure 1 is a top view, Fig. 2 a longitudinal section, and Fig. 3 a transverse section, of a machine embodying my invention. Fig. 4 is a top view, and Fig. 5 a transverse section, of one of its corrugating-rollers. The remaining figures are hereinafter described.

In using the said machine, a pack of counter-blanks is to be laid upon the endless apron, the straight edges or chords of the blanks resting thereupon, and the pack being placed between the abutment of the apron and that of the slide for abstracting the blanks successively from the pack. On each of the blanks being so taken from the pack the latter will be advanced, so as to force the next succeeding blank into place to be acted on in turn by the slide, by which it will be delivered between the jaws of a pair of feed and corrugating rollers, by which it will, while passing between them, not only be advanced, but be corrugated by them, as hereinafter described. After this it will be moved into place across the mouth of a hollow or female die, into which and between the movable jaws of which it will be forced by a male die. By the action of such jaws and the male die the blank will be grasped firmly and stretched while passing into the female die, and it will finally be condensed and molded therein. In the meantime it will have its bottom lip or flange turned in very advantageously, on account of it being corrugated at its middle portion during the passage of the blank between the feed and corrugating rollers.

The machine thus embodies not only a feeding-apron and a delivery-slide provided with mechanism for operating them, as hereinafter explained, but feed and corrugating rollers and male and female dies, as set forth.

It also has mechanism for expelling the molded counter from the female as well as from the male die, in order to insure its discharge from the machine.

Furthermore, the machine or its female die is provided with recesses or means of allowing the corner portions of the counter-blank to freely turn down and enter the mold without being wrinkled in so doing, as they would be without such recesses.

In the drawings, A denotes the frame of the machine, within which is a driving-shaft, B, provided with a spur-gear, C, and a grooved cam-wheel, D. The said wheel D has projecting from one side of it a crank-pin, $a$, carrying a friction-roller, $b$, which enters a vertical slot, $c$, in the cross-head $d$ of the male molding-die E, the same being as represented in Fig. 2.

In this machine besides such molding-die there is to co-operate with it a female-die, a horizontal section of which is shown in Fig. 6, it being constructed in two separate movable halves or parts, F F, arranged as shown. These parts F F are disposed between and rest against elastic bearings or plates $ff$, fixed on the inner sides of two metallic plates, $g\,g$, connected by screw-bolts $h\,h\,h\,h$, provided with a nut, $i$, to each. On setting up the nuts the plates $g\,g$ will be drawn toward each other.

Furthermore, there is in the rear of the two die parts F F another elastic bearing, $k$, fixed to a metallic plate, $l$, behind which are two wedges, $m\,n$. These wedges are provided with adjusting-screws $o\,o$, by which each of them may be moved longitudinally, so as to either increase or decrease the pressure of the bearing $k$ against the die parts F F.

Besides mechanism as above mentioned, the machine has an endless feeding-apron, corrugating and feeding rollers, mechanism for delivering the blanks from the pack to the feed or corrugating rollers, and also mechanism for insuring the advance of a corrugated blank to its proper position for being molded by the dies.

The feeding-apron is shown at G as applied to a table, H, having suitable parallel guides $l^1\,l^1$, between which the apron is arranged, as represented. This apron, supported on rollers $m^1\,n^1$, may, to advance the pack of counter-blanks, be moved by any suitable means, as, for instance, a grooved wheel, $o^1$, provided with a rope, $p$, and a weight, $q$, the said wheel being fixed on the arbor of the outermost roller. The rope fastened to the periphery of the wheel, and wound about such one or more times, has the weight suspended from it, (the said rope,) as shown in Fig. 2.

An abutment, $r$, fixed upon the endless apron, serves with it to press the pack up to a stationary abutment, $s$, within which is the carriage or slide I, for separating a blank from the pack, and forcing such blank forward into the bite of the feed and corrugating rollers K K.

The slide I, supported in suitable guides, has mechanism applied to it for moving it longitudinally. Such mechanism may be thus described: An arm, M, pivoted at its lower part to the frame, carries a friction-roller, $t$, which extends into the groove $u$ of the cam-wheel D. To the upper part of such arm, and to the slide I, a duplex connection-link, N, is jointed. This link is composed of two bars, $u^1 v$, provided with interlocking teeth, and connected by a set-screw, $w$, which goes through a slot, $x$, in one bar, and is screwed into the other. By such means the connection-link may be increased or diminished in length, as occasion or counter-blanks of different sizes may require.

There extends from the slide I a projection, $y$, which, while the slide is being moved forward, acts against one end of the blank bearing against the slide, and thereby separates such blank from the pack, and causes such blank to advance with the slide and to pass into the bite of the feed and corrugating rollers. Each of the said rollers is furnished with a movable segment or jaw, $z$, (see Figs. 4 and 5,) which has teeth on its arc, and rests against an elastic bearing, $a^1$.

The jaw is to be applied to the body $b^1$ of the roller, so as to move radially therein. These jaws are to feed the blank forward, the teeth of the rollers being for corrugating it. The said rollers K K are fixed on vertical shafts $b^2 c'$, properly supported in a bracket, $d'$, and having connecting-gears $e' e'$ at their upper ends. On one of such shafts is a bevel-gear, $f'$, that engages with another such gear, $g'$, fixed on a shaft, $h'$, provided with a gear, $i'$, to engage with the gear C.

On the driving-shaft being revolved the shaft $h'$ will be put in action, so as to produce the necessary movements of the feed-rollers. These rollers corrugate the lower part of the blank a sufficient distance along the middle of its chord.

The blank usually has the form of a segment of an ellipse or an approximation thereto, its chord, while the blank is in the pack, being downward or resting on the endless apron. The object of thus corrugating the lower part of the blank is to enable the lip or flange of the blank to be bent to advantage in the mold.

After the blank may have been properly corrugated, it being advanced in the meantime, its further advance to the proper position across the mouth of the female die is effected by a stud, $k'$, projecting from one of the shafts of the feed-rollers. This stud, while being revolved with the shaft, is carried against the rear end of the blank and forces the blank forward away from the feed-rollers.

In Fig. 3 there is shown in dotted lines a stop or gage, $l^2$, for the blank to bring up against, such gage being extended from one to another of two guide-plates, $m^2 n^2$, for receiving the counter-blank and guiding it to place across the mouth of the female die.

Fig. 7 is a lower edge view of the upper of such plates. Fig. 8 is a top view, and Fig. 9 a front elevation, of the other or lower plate.

The upper plate has three notches, $o^2 p' q'$, and besides it has a guide-groove, $r'$, in its lower part, all being as shown. This guide groove or mouth ranges with the backs of the projections $s' s'$, that flank the middle notch, which is to receive the male die in its passage into the female die. The blank passes in rear of the said projections $s' s'$. The notches $o^2 q'$ are to allow the blank while being bent by the male die to readily escape out of the guide-plate and fold against the said male die. Furthermore, the lower guide-plate $n^2$ is notched, as shown at $t' t'$, to enable the ends of the blank to freely turn down without obstruction while the blank is being folded on the male die. This obviates the tendency of the counter, while being molded, to be wrinkled at the upper part of its middle, which it would be likely to be, were it not for the said notches.

There are to the dies two expellers—one, $u^2$, being arranged on the male die, and the other, $v'$, in the female die—each as a slide-rod working against a helical spring arranged with it, as shown at $w'$. While the blank is in the act of being forced forward, the expeller of the female die will be pressed back against the power of its spring, and during withdrawal of the male from the female die the expeller, by its spring, will be forced against the counter, so as to shove it out of the female die. On advance of the male die its expeller will be crowded back against the power of its spring, and during the retreat of the male die the expeller, by the reaction of the spring, will force the counter off the male die, and thus cause such counter to be discharged from the machine.

Each part F of the female die is formed with a shoulder, $x'$, for causing the blank to be bent in just above its chord, so as to form the counter with the usual bottom lip or flange. The female dies are to be otherwise properly formed to give, in conjunction with the male die, the requisite mold or shape of the counter.

I usually groove the male die on its flanks, as shown at $y' y'$, such being to aid in withdrawing the counter from the mold.

Fig. 10 is an end view of the female dies, showing their mouth or entrance. Fig. 11 is an inner side view of one of them. Each of the said dies at its mouth is recessed, or flares both laterally and downward, as shown at $a^2$, each recess tapering as it extends inward. Such recess is in continuation of one of the notches $t'$ $t'$, and is to enable the part of the counter-blank that passes in one of such notches to freely enter the mold and be gradually and properly folded or brought into shape without being wrinkled.

Having thus described my machine, what I claim therein is as follows:

1. The combination of the feed and corrugating rollers K K with the male and female dies E F F, all being constructed and provided with mechanism for operating them, substantially as set forth.

2. The combination of the delivering-slide I with its supporting-abutment $s$, the feed-rollers K K, and the male and female dies E F F, constructed and provided with mechanism for operating them, as set forth.

3. The combination of the stud $k'$ with the delivery-slide I, the feed-rollers K K, and the male and female dies E F F, arranged and provided with mechanism for operating them, substantially as explained.

4. The combination of the feeding-apron G and the delivery-slide I, provided with mechanism for operating them, as described, with the feed and corrugating rollers K K and the male and female dies E F F, applied and to operate essentially as set forth.

5. The combination of the two expellers $u^2$ $v'$ and their operative springs $w'$ $w'$ with the male and female dies E F F, arranged and to operate as set forth.

6. The guide-plates $m^2$ $n^2$, provided with the notches $o^2$ $p'$ $q'$ $t'$ $t'$ arranged in them, substantially as and for the purposes described.

7. The male die grooved on its flanks, essentially as and for the purpose set forth.

8. The corrugating feed-rollers K K, provided with the movable feeding-segments $z$ $z$, arranged and combined with such rollers substantially as explained.

9. The female dies provided with the tapering recess $a^2$, arranged in or at its mouth, substantially as and for the purpose specified.

JOSEPH KIEFFER.

Witnesses:
R. H. EDDY,
S. N. PIPER.